US011158010B2

(12) United States Patent
Botea et al.

(10) Patent No.: US 11,158,010 B2
(45) Date of Patent: Oct. 26, 2021

(54) INCREMENTAL SEARCH BASED MULTI-MODAL JOURNEY PLANNING

(71) Applicant: INTERNATIONAL BUSINESS MACHINES CORPORATION, Armonk, NY (US)

(72) Inventors: Adi Botea, Dublin (IE); Elizabeth Daly, Dublin (IE); Akihiro Kishimoto, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 912 days.

(21) Appl. No.: 14/841,620

(22) Filed: Aug. 31, 2015

(65) Prior Publication Data

US 2017/0060903 A1    Mar. 2, 2017

(51) Int. Cl.
*G06F 16/00*    (2019.01)
*G06Q 50/14*    (2012.01)
*G06Q 10/04*    (2012.01)

(52) U.S. Cl.
CPC .......... *G06Q 50/14* (2013.01); *G06Q 10/047* (2013.01)

(58) Field of Classification Search
None
See application file for complete search history.

(56) References Cited

U.S. PATENT DOCUMENTS

| 8,265,967 | B2 | 9/2012 | DeMarcken et al. |
| 2008/0168093 | A1 | 7/2008 | DeMarcken |
| 2011/0112759 | A1* | 5/2011 | Bast ................. G01C 21/3423 701/533 |
| 2013/0046456 | A1* | 2/2013 | Scofield ............ G01C 21/3423 701/117 |

(Continued)

FOREIGN PATENT DOCUMENTS

| CN | 102915401 | 2/2013 |
| EP | 2217880 | 5/2009 |

(Continued)

OTHER PUBLICATIONS

Boskovic, et al., "Intelligent Spacecraft Control Using Multiple Models, Switching, and Tuning", Proceedings of the 1999 IEEE, International Symposium on Intelligent Controll intelligent Systems and Semiotics, Cambridge, MA, Sep. 1999, pp. 84-89.

(Continued)

*Primary Examiner* — Anhtai V Tran
(74) *Attorney, Agent, or Firm* — Tutunjian & Bitetto, P.C.; Kurt Goudy

(57) ABSTRACT

A method and system are provided. The method includes incrementally solving, by a processor-based journey plan incremental searcher, a current journey planning request from a user. The solving step includes performing a current search for at least one journey plan that satisfies the current journey planning request by accessing a database storing journey planning information derived from results to a plurality of previous journey planning requests. The solving (Continued)

step further includes storing, in the database, at least part of the information discovered during the current search for responding to a subsequent journey planning request. The solving step also includes providing the at least one journey plan to the user.

20 Claims, 13 Drawing Sheets

(56) References Cited

U.S. PATENT DOCUMENTS

| | | | |
|---|---|---|---|
| 2013/0282766 A1 | 10/2013 | Goya et al. | |
| 2014/0067254 A1 | 3/2014 | Berlingerio | |
| 2014/0351037 A1* | 11/2014 | Shaam | G06Q 50/14 705/14.23 |

FOREIGN PATENT DOCUMENTS

| | | |
|---|---|---|
| EP | 2565582 | 3/2013 |
| JP | 2005044173 A | 2/2005 |
| WO | 2002056249 | 7/2002 |
| WO | 0203716 | 10/2002 |
| WO | 2006063122 | 6/2006 |
| WO | 2007012199 | 2/2007 |
| WO | 2009065637 | 5/2009 |
| WO | 2009065638 | 5/2009 |
| WO | 2011004026 | 1/2011 |
| WO | 2011060122 | 5/2011 |
| WO | 2011125059 | 10/2011 |
| WO | 2013014612 | 1/2013 |
| WO | 2013169522 | 11/2013 |

OTHER PUBLICATIONS

Hernandez, et al., "Tree Adaptive A", Proceedings of 10th Int. Conference on Autonomous Agents and Multiagent Systems (AAMAS 2011), Taipei, Taiwan, May 2-6, 2011, 8 pages.

Koenig, et al., "Lifelong Planning A", Artificial Intelligence 155, Elsevier, May 2004, pp. 94-146.

Narenda, et al., "Adaptation and Learning Using Multiple Models, Switching, and Tuning", IEEE Control Systems, Jun. 1995, pp. 37-51.

Narenda, et al., "Improving Transient Response of Adaptive Control Systems using Multiple Models and Switching", IEEE, Proceedings of the 32nd Conference on Decisions and Control, San Antonio, TX, Dec. 1993, pp. 1067-1072.

Şeref, et al., "Incremental Network Optimization: Theory and Algorithms", Operations Research, May 2009, pp. 586-594, vol. 57, No. 3.

Stentz, A., "Optimal and Efficient Path Planning for Partially-Known Environments", Proceedings of IRobotics and Automation, San Diego, CA., May 1994, pp. 3310-3317.

* cited by examiner

INCREMENTAL SEARCH BASED MULTI-MODAL JOURNEY PLANNING

BACKGROUND

Technical Field

The present invention relates generally to information processing and, in particular, to incremental search based multi-modal journey planning.

Description of the Related Art

Calculating a multi-modal journey plan solution can be computationally expensive. The expense increases when taking into account multiple criteria such as walking quotas, limiting the number of transportation links in a plan, and so forth. Thus, there is a need for a multi-modal journey plan solution that is not unduly computationally expensive when taking multiple criteria in account.

SUMMARY

According to an aspect of the present principles, a method is provided. The method includes incrementally solving, by a processor-based journey plan incremental searcher, a current journey planning request from a user. The solving step includes performing a current search for at least one journey plan that satisfies the current journey planning request by accessing a database storing journey planning information derived from results to a plurality of previous journey planning requests. The solving step further includes storing, in the database, at least part of the information discovered during the current search for responding to a subsequent journey planning request. The solving step also includes providing the at least one journey plan to the user.

According to another aspect of the present principles, a system is provided. The system includes a processor-based journey planning incremental searcher for incrementally solving a current journey planning request from a user. The journey planning incremental searcher incremental solves the journey planning request from the user by performing a current search for at least one journey plan that satisfies the current journey planning request by accessing a database storing journey planning information derived from results to a plurality of previous journey planning requests. The journey planning incremental searcher incremental solves the journey planning request from the user further by storing, in the database, at least part of the information discovered during the current search for responding to a subsequent journey planning request. The journey planning incremental searcher incremental solves the journey planning request from the user also by providing the at least one journey plan to the user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to incremental search based multi-modal journey planning. Advantageously, the present principles provide a significant increase in performance over the prior art. Moreover, the present principles support several different exemplary use cases where computational cost may otherwise be prohibitively high.

Several concepts of the present invention include, but are not limited to: (1) identifying similar, but not necessarily identical journey plan requests; and (2) re-using knowledge gained in the computation of previous journey plans to speed up the computation of a current journey plan.

The present principles are able to serve many different queries that, in turn, support many different use cases such as, but not limited to, an accessibility analysis within a city, real-time public transportation route recommendations, a recommender system in a social housing domain and route planning optimization problems for logistics operations. The present principles exploit the case where large portions of the solution space are applicable for similar input queries. For example, a portion of the solution space may be applicable when the input query has a similar departure time or a similar location. As a result, the ability to reuse partial solutions from previous queries can provide a significant savings on computational costs. These and other benefits of the present principles are readily identified by one of ordinary skill in the art, given the teachings of the present principles provided herein.

As used herein, multi-modal journey planning refers to planning a journey that involves multiple modes of transportation. Such modes can include, but are not limited to, walking, biking, a vehicle (e.g., under the control of the user or a person acting in concert with the user (that is, having the same goal of going to the same destination), public transportation (taxis, buses, trains, planes, etc.) that can include many intermediate stops before reaching the destination, and so forth. It is to be appreciated that the present principles is not limited to any particular modes of transportation and, as such, the preceding examples are merely illustrative.

In an embodiment, the present principles involve a search for journey plans in one or more search spaces. Each of the search spaces can have a set of states, including a start state, an end state, and one or more intermediate states. Moreover, these states can include one or more goal states that can correspond to one or more destinations (e.g., starting, intermediate and/or final destinations). At least one of the states includes respective maximum thresholds for interchanges, a walking time, and a cycling time. The search can be performed, for example, on a graph structure, a tree structure, and so forth.

Figure 1:
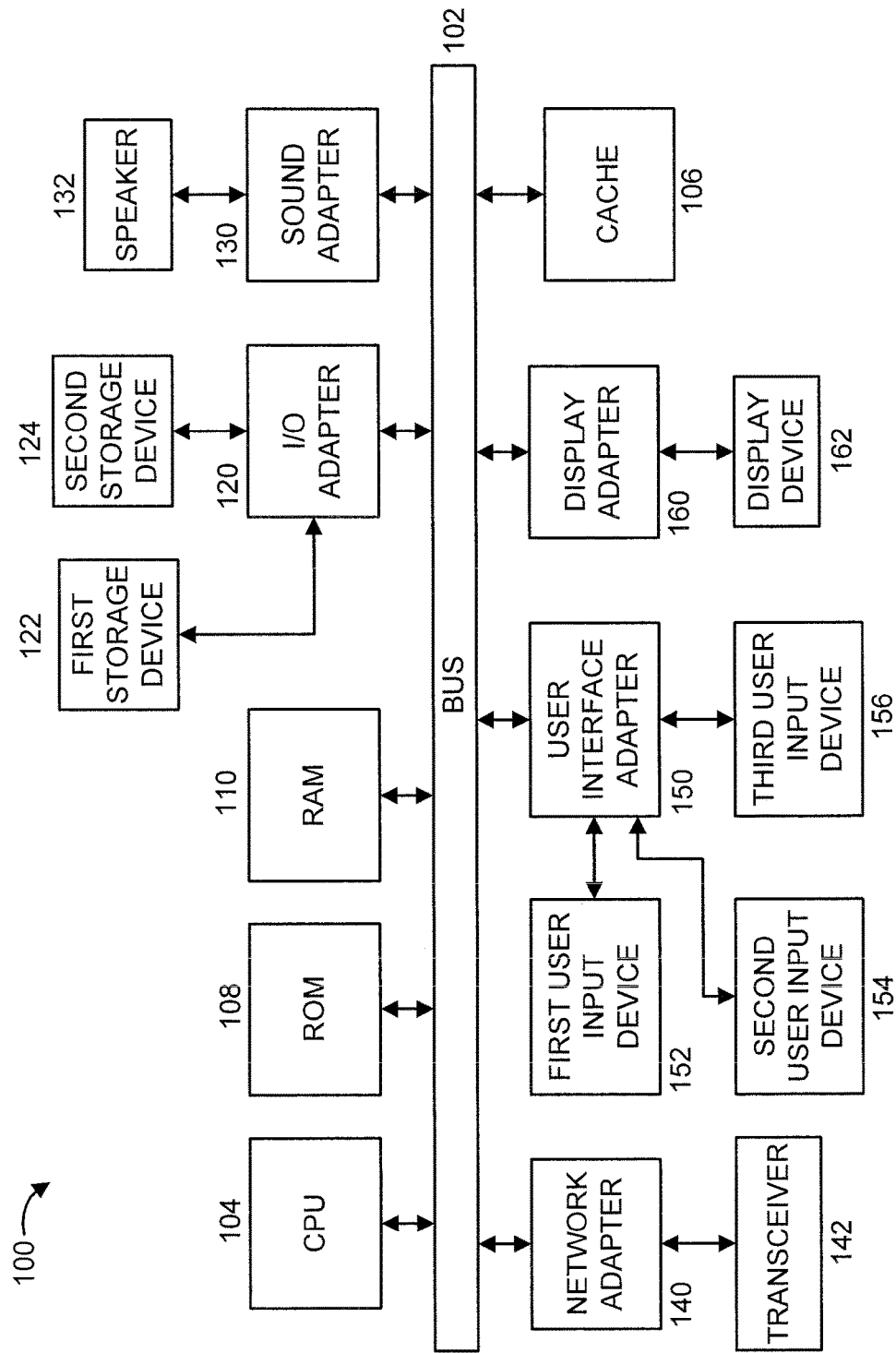
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
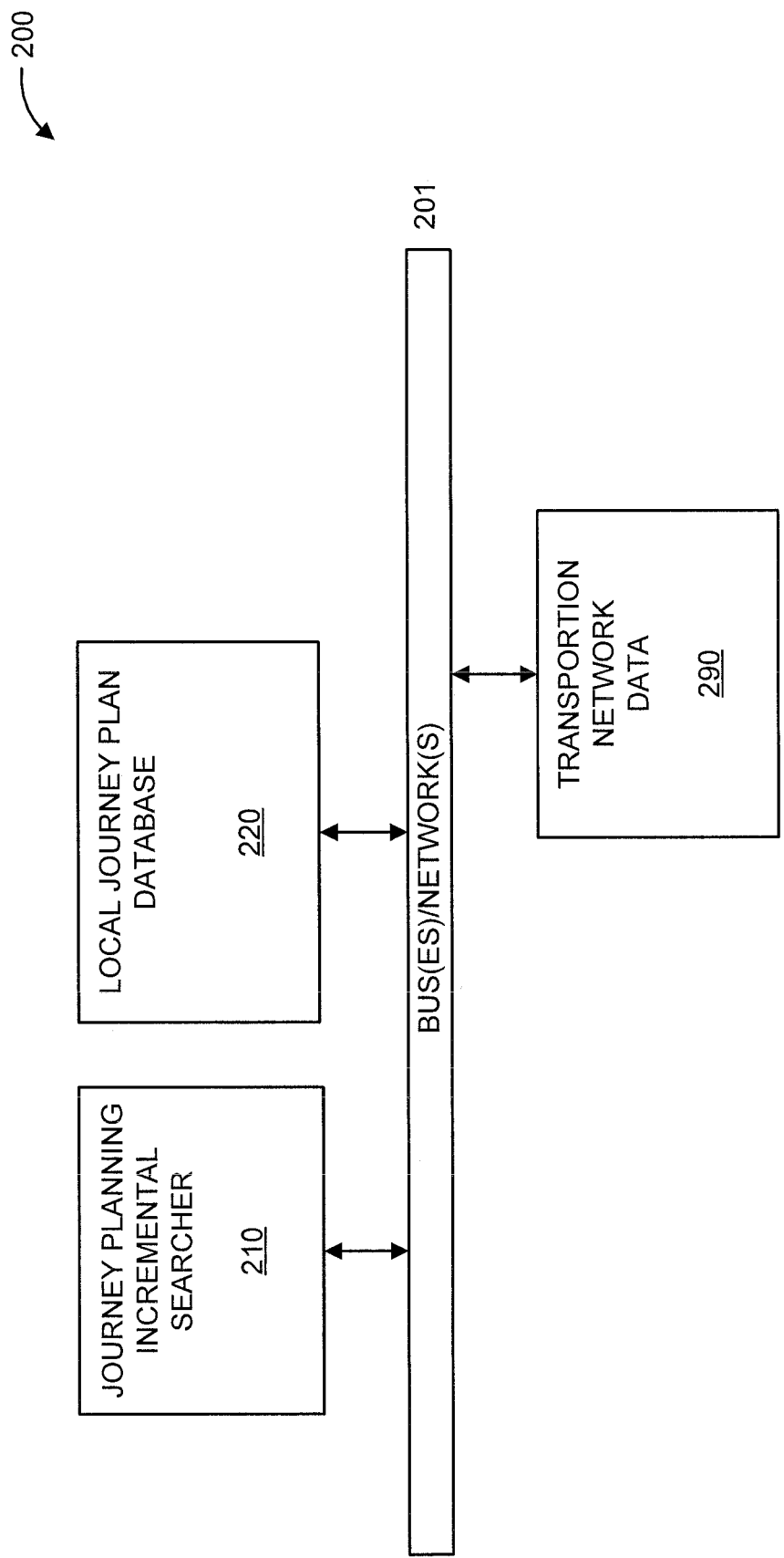
FIG. 2 shows an exemplary system 200 for incremental search based multi-modal journey planning, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
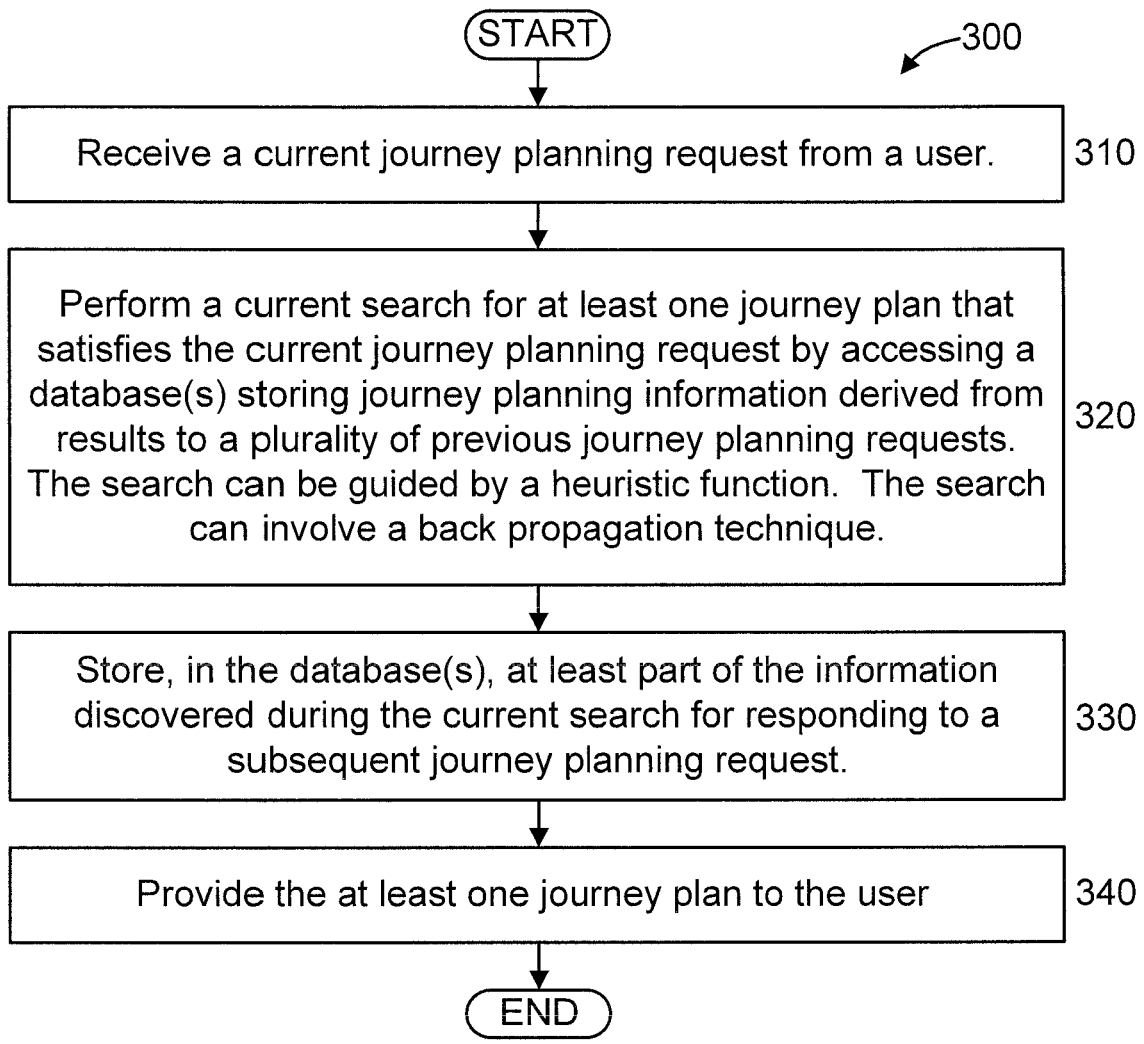
FIG. 3 shows an exemplary method 300 for incremental search based multi-modal journey planning, in accordance with an embodiment of the present principles.

Further, it is to be appreciated that processing system 100 may perform at least part of the method described herein including, for example, at least part of method 300 of FIG. 3 and/or at least part of method 400 of FIGS. 4-12. Similarly, part or all of system 200 may be used to perform at least part of method 300 of FIG. 3 and/or at least part of method 400 of FIGS. 4-12.

FIG. 2 shows an exemplary system 200 for incremental search based multi-modal journey planning, in accordance with an embodiment of the present principles.

The system 200 includes a journey planning incremental searcher 210 and a local journey plan database 220.

The system 200 includes and/or otherwise interfaces with a transportation network data storage system 290.

The journey planning incremental searcher 210 performs incremental searches for journey plans. The searches can be performed responsive to journey planning requests issued from one or more users. In an embodiment, a current search that is performed in response to a current (pending) journey planning request can be performed incrementally by reusing previously stored information (e.g., from previous journey plan searches) to fill in information provided as part of a current journey plan that, in turn, is provided in response to the current journey planning request.

The local journey plan database 220 stores information used to respond to previous journey planning requests that can be reused to respond to a current journey planning request. In an embodiment, the database 220 is implemented as a hard disk or optical disk memory device or a solid state drive (SSD). In an embodiment, the database 220 is implemented as, or includes, a cache. In an embodiment, local journey plan database 220 has a faster retrieval speed than the transportation data network 290. However, it is to be appreciated that database 220 can be implemented using any memory technology, while maintaining the spirit of the present principles.

The transportation network data storage system 290 stores information for responding to journey plan requests. In an embodiment, system 290 is remote from, but accessible by, system 200. In another embodiment, system 290 is part of system 200. The transportation network data storage system 290 can be implemented using any type of storage device(s) including, but not limited to, disk drives, hard drives, solid state devices, caches, cloud storage, network attached storage (NAS), and so forth. The transportation network data storage system data 290 can include information from sources including, but not limited to, prior journey planning searches, public transport data (e.g., stops, routes, trips with arrival and departure times at each stop along a route), roadmap data (e.g., nodes and links), car parking lots and shared bike stations, or a subset of such data sources.

In the embodiment shown in FIG. 2, the elements thereof are interconnected by bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 200 are readily determined by one of ordinary skill in the art, given the teachings of the present principles provided herein, while maintaining the spirit of the present principles.

FIG. 3 shows an exemplary method 300 for incremental search based multi-modal journey planning, in accordance with an embodiment of the present principles.

At step 310, receive a current journey planning request from a user. In an embodiment, the current journey planning request includes one or more constraints. The constraints can include, but are not limited to, minimizing a travel time, minimizing transportation mode changes, limiting an amount of walking, limiting an amount of biking, limiting an amount of time in a car, limiting an amount of time traveling at certain hours of day (e.g., a night), and so forth. The preceding constraints are merely illustrative and, thus, other constraints can also be used in accordance with the teachings of the present principles, while maintaining the spirit of the present principles.

At step 320, perform a current search for at least one journey plan that satisfies the current journey planning request by accessing a database(s) storing journey planning information derived from results to a plurality of previous journey planning requests.

In an embodiment, the current search is performed over at least one search space having a set of states. In an embodiment, one or more of the states in the set has a respective temporal component.

In an embodiment, the states are associated with different constraints that can overlap with constraints from the current search.

In an embodiment, performing the current search can include guiding the search using a heuristic function. In an embodiment, the heuristic function is used to estimate a travel time from a state of a search space to a given location. In an embodiment, the heuristic function is updated based on state dominance of states in one or more search spaces. In an embodiment, a back propagation technique is performed that propagates heuristic values through a search graph space commencing at an end state of a graph search space or subgraph search space and traversing in a direction from end-to-beginning. In an embodiment, the back propagation technique stores these back-propagated heuristic values in the database described in step 330. [Hence, while shown as part of step 325, the back propagation technique can be performed jointly as part of steps 325 and 330.

At step 330, store, in the database(s), at least part of the information discovered during the current search for responding to a subsequent journey planning request.

In an embodiment, step 330 can involve storing at least part of the information in a cache.

In an embodiment, information (e.g., results) stored for the current journey planning request can include a reusable portion of a search graph. In an embodiment, the reusable portion can include, but is not limited to, a cost-to-goal estimation, an actual journey plan from a subset of states to a goal, and so forth. Thus, information other than plans themselves can be stored in step 330, as well as complete plans or partial plans.

In an embodiment, the information (e.g., results) stored for a given state in a search space can be transferred to one or more other states in the search space or in another search space, based on dominance and commonality relations.

Moreover, a search space having a set of states can be pruned using state dominance.

In an embodiment, at least part of the information (e.g., results) stored in the database includes an information pair that includes a state of a search space and a lower bound on an arrival time. In an embodiment, at least part of the information (e.g., results) stored in the database includes an information pair that includes a state of a search space and an exact value of an arrival time.

At step 340, provide the at least one journey plan to the user.

It is to be appreciated that as method 300 is performed over and over, the database is being incrementally built by the storing (adding) of information for each search that is performed.

A description will now be given regarding an embodiment of the present principles.

Employing a heuristic search is one way to embody the present principles.

An embodiment involving a heuristic search can incorporate the A* algorithm, enhanced with incremental search as explained herein. The heuristic search can involve a heuristic function that estimates the travel time from a state (in a search space) to the destination. Of course, other heuristic functions can also be used in accordance with the teachings of the present principles, while maintaining the spirit of the present principles.

In an embodiment, the heuristic value of each state is pre-computed by solving a relaxed version of the original problem. In an embodiment, Dijsktra's algorithm can be used to calculate the heuristic value. Of course, other techniques can also be used to calculate the heuristic value. Additionally, an embodiment can use dominance relationships among states (in one or more search spaces) for omitting inferior states that can never lead to optimal journey plans.

In an embodiment, the incremental search involves caching information that preserves previous search effort to speed up future searches. Cached results include pairs of a state and a lower bound on the best arrival time, and pairs of a state and an exact value for the arrival time (if they are available). Additionally, cached data include optimal sub-plans for the states where exact values for the arrival time are available. These lower bounds can increase the accuracy of the pre-computed heuristic. Of course, other data can also be cached and/or otherwise preserved from a current search to use for responding to a subsequent search. When one A* search terminates, these results are calculated by a back-propagation of heuristic values through the search graph constructed by A* and stored in data structures such as hash tables.

Figure 4:
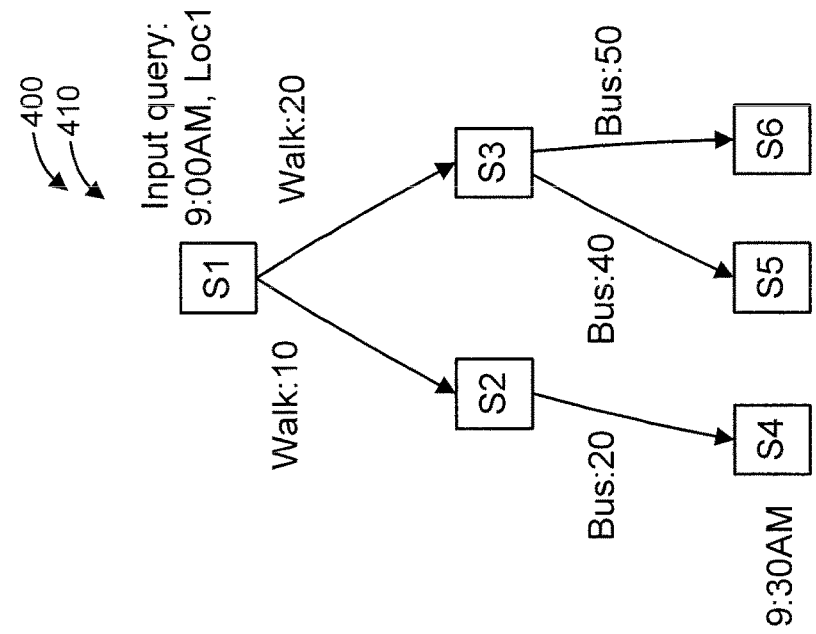
FIG. 4 shows a first step 410 of a previous search 400, in accordance with an embodiment of the present principles.

FIG. 4 shows a first step 410 of a previous search 400, in accordance with an embodiment of the present principles. In the first step 410, the initial query is provided. The initial query includes a location ("Loc1") and a starting time ("Start Time"). Additionally, the initial query can include constraints such as, for example, but not limited to, a walking quota ("Walking Quota"), a bus quota ("Bus Quota"), a hops quota ("Hop Quota"), and so forth. Hence, the search S1 can be performed as follows: S1->(Loc1, Start Time, Walking Quota, Bus Quota, Hops Quota, etc.). The initial search 400 involves states S1, S2, S3, S4, S5, and S6, and a target T1.

Figure 5:
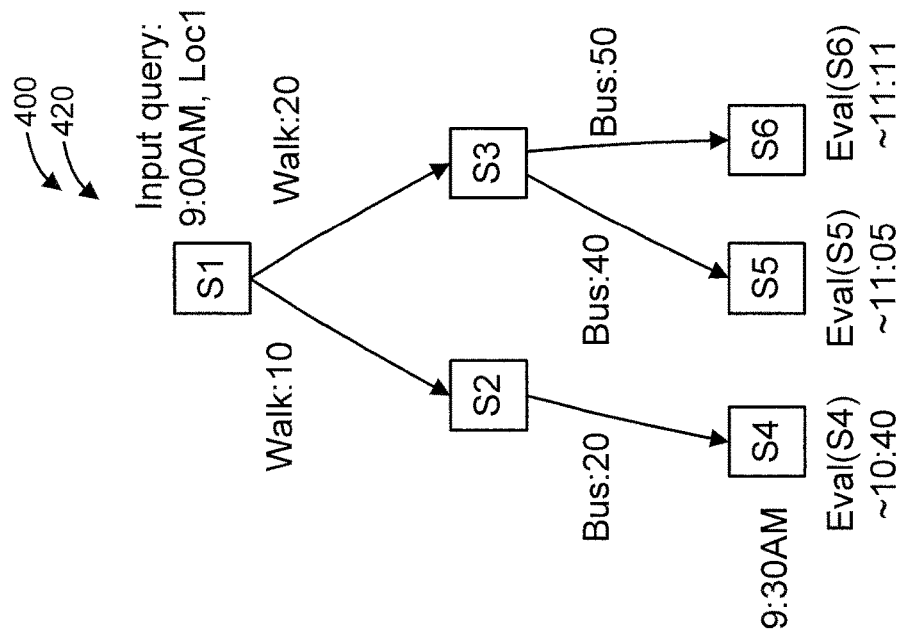
FIG. 5 shows a second step 420 of previous search 400, in accordance with an embodiment of the present principles.

FIG. 5 shows a second step 420 of previous search 400, in accordance with an embodiment of the present principles. In the second step 420, states S4, S5, and S6 are evaluated to provide times for those states. For example, at state S4, the location associated with S4 will be reached at 9:30 AM. A heuristic estimation indicates that, from state S4, the target can be reached at 10:40 AM.

Figure 6:
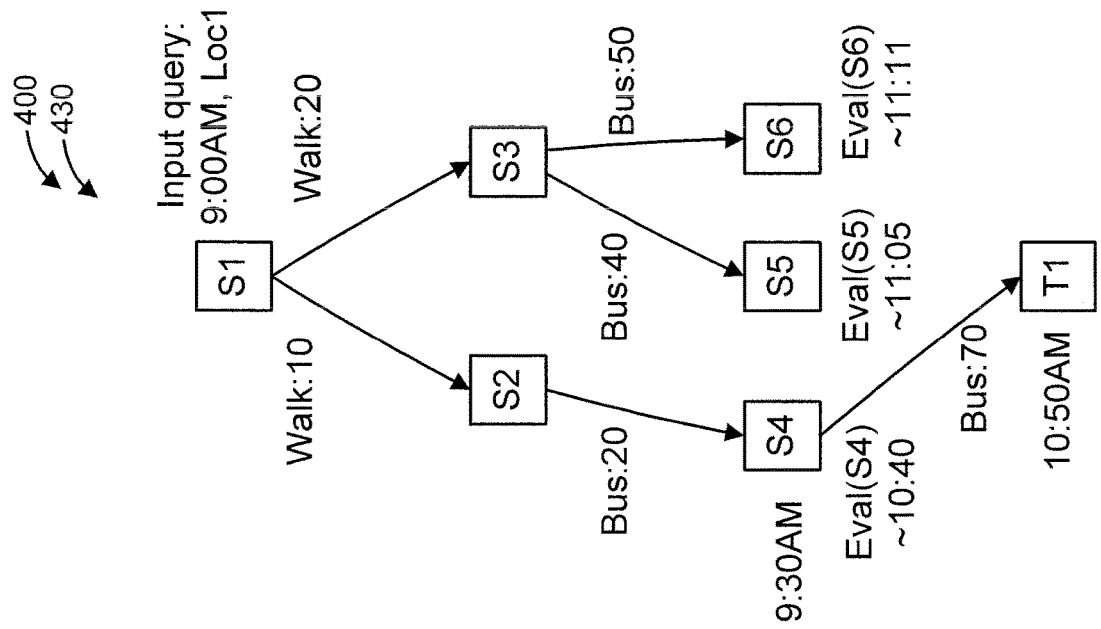
FIG. 6 shows a third step 430 of previous search 400, in accordance with an embodiment of the present principles.

FIG. 6 shows a third step 430 of previous search 400, in accordance with an embodiment of the present principles. In the third step 430, the search reaches the target T1 using an optimal route, corresponding to an optimal (best) arrival time of 10:50 AM.

Figure 7:
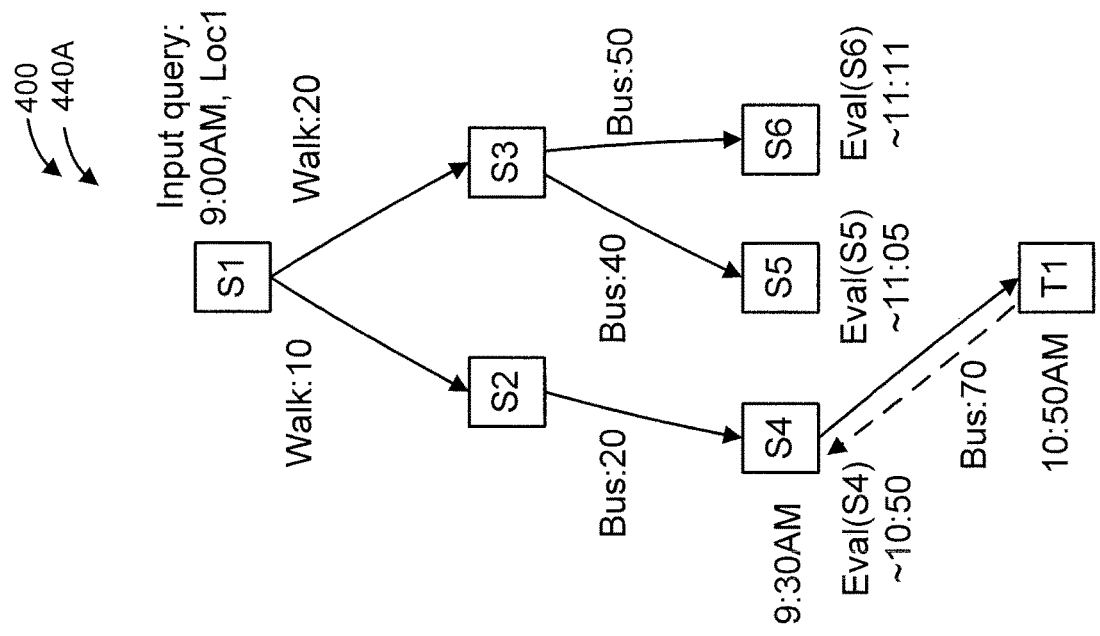
FIG. 7 shows a first portion 440A of a fourth step 440 of previous search 400, in accordance with an embodiment of the present principles.

FIG. 7 shows a first portion 440A of a fourth step 440 of previous search 400, in accordance with an embodiment of the present principles. In the first portion 440A of the fourth step 440, the information obtained at step 430 (the optimal arrival time at target T1) is propagated back to improve the estimates at other states visited during the search. For example, the heuristic estimation of state S4 (estimating the time to reach target T1 from S4) is increased from 10:40 to 10:50. The optimal arrival time at T1 along with the improved heuristic estimate for S4 are saved in the database.

Figure 8:
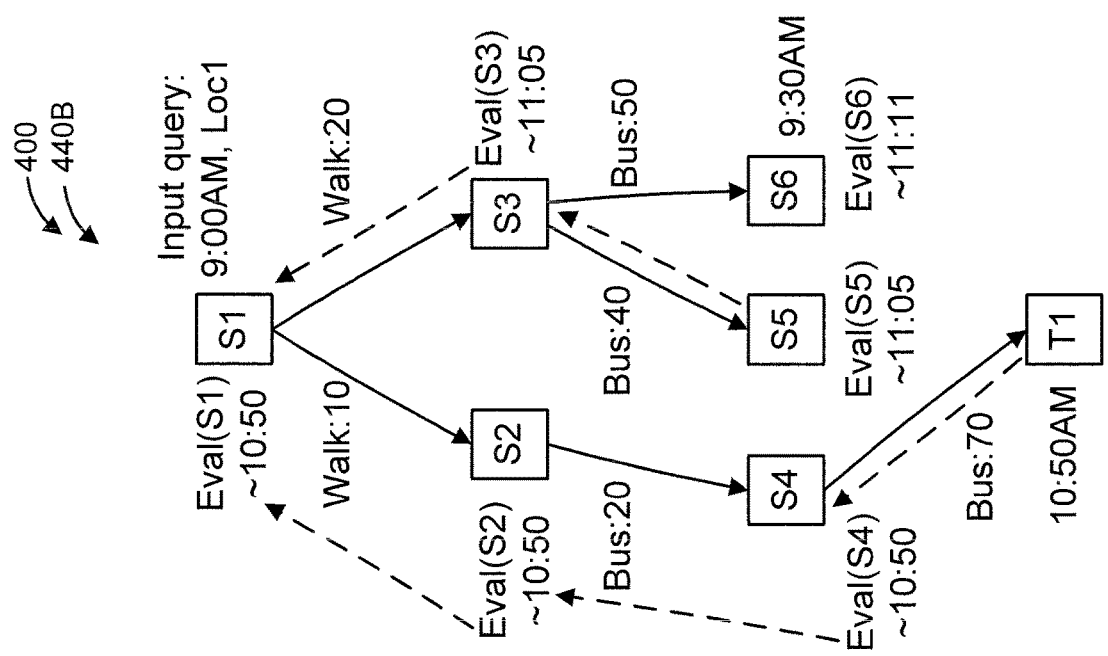
FIG. 8 shows a second portion 440B of the fourth step 440 in previous search 400, in accordance with an embodiment of the present principles.

FIG. 8 shows a second portion 440B of the fourth step 440 in previous search 400, in accordance with an embodiment of the present principles. In the second portion 440B of the fourth step, the information obtained at step 430 (the optimal arrival time at target T1 and estimated arrival time at S5) is further propagated back (e.g., to states S3, S2 and S1) to improve their heuristic estimates. These improved heuristic estimates are saved in the database.

Figure 9:
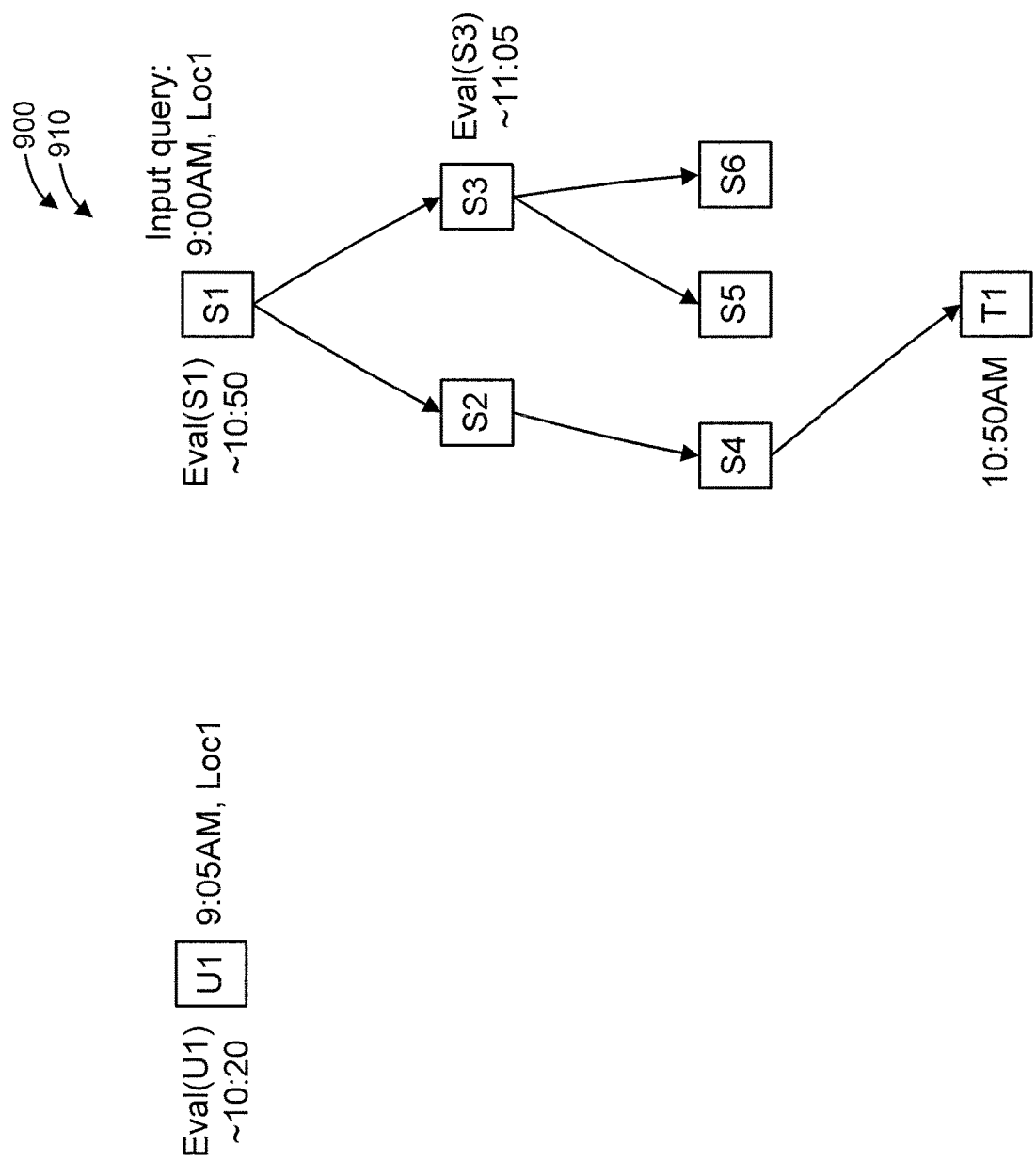
FIG. 9 shows a first step 910 of a current search 900, in accordance with an embodiment of the present principles.

FIG. 9 shows a first step 910 of a current search 900, in accordance with an embodiment of the present principles. In the first step 910, a new input query is provided. The new input query includes a location (Loc 1) and a starting time (Start Time=9:05 AM). U1 is the initial state in the search associated with the new query. In the first step 910, an initial estimate of U1 is provided (i.e., it is estimated that the target can be reached by 10:20 AM). The current search 400 involves states S1, S2, S3, S4, S5, S6, target state T1, and the initial state U1.

Figure 10:
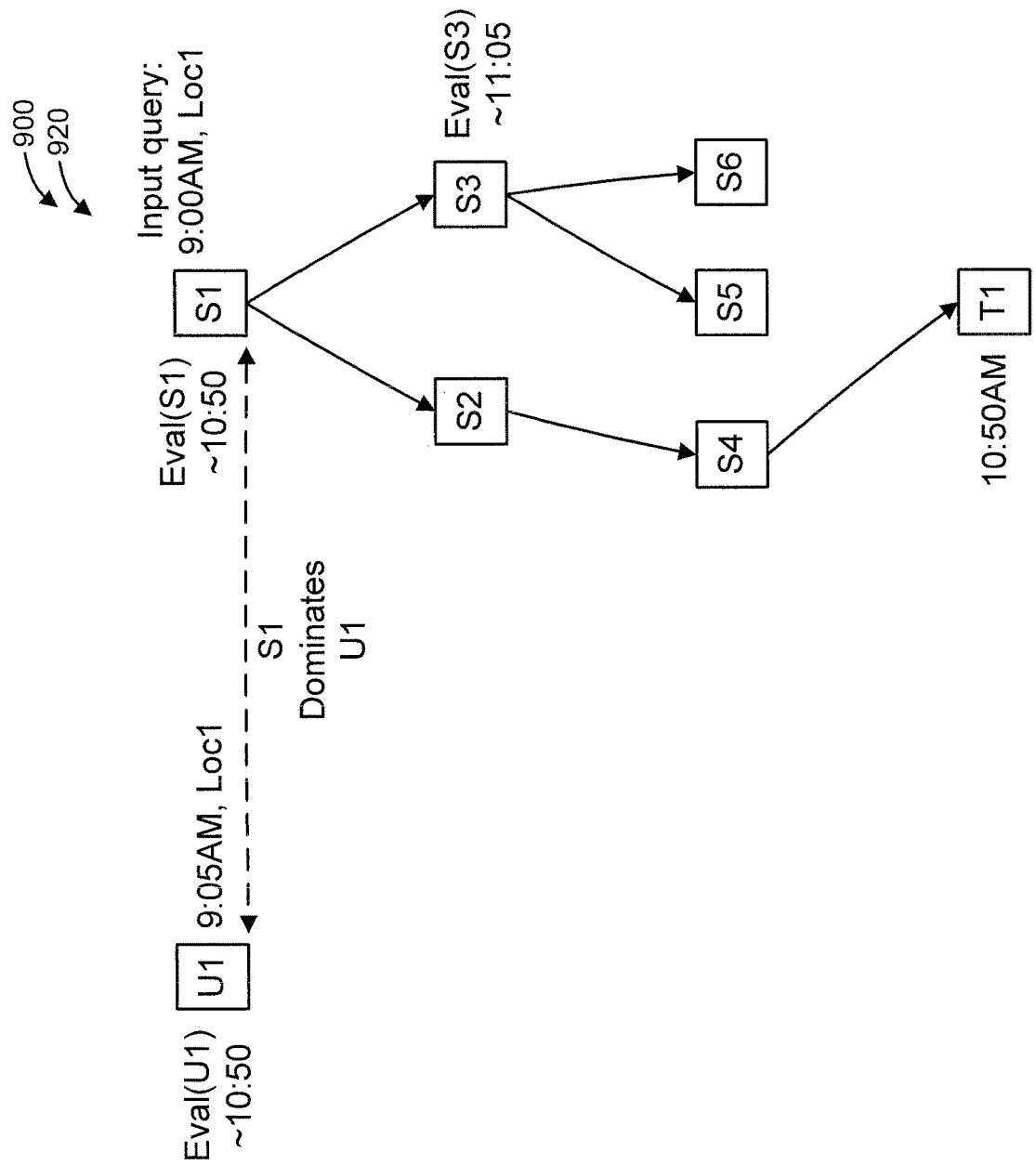
FIG. 10 shows a second step 920 of current search 900, in accordance with an embodiment of the present principles.

FIG. 10 shows a second step 920 of current search 900, in accordance with an embodiment of the present principles. In the second step 920, an evaluation of the initial estimate of U1 is performed. Upon determining that the initial estimate of U1 is too optimistic, and that S1 dominates U1, the estimate of U1 is updated with more accurate information by retrieving the heuristic estimate of S1 from the database. In further detail, the estimate of U1 is updated to now include an evaluation time of 10:50 in place of 10:20.

Figure 11:
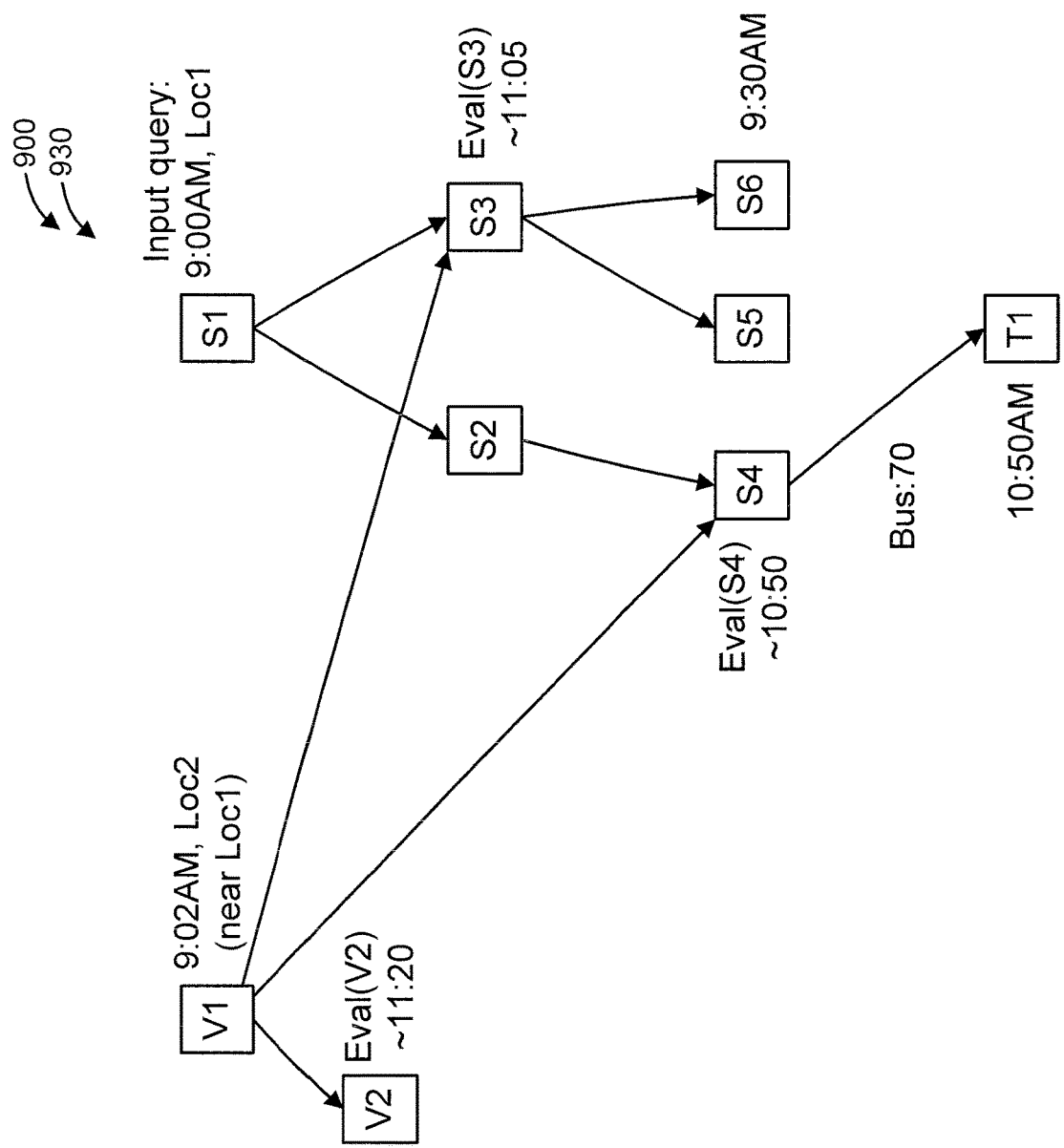
FIG. 11 shows a third step 930 of current search 900, in accordance with an embodiment of the present principles.

FIG. 11 shows a third step 930 of current search 900, in accordance with an embodiment of the present principles. In the third step 930, when searching to solve a new query, the search starts from an initial state V1. This state has several successor states, such as V2 (new), S3 and S4 (previously encountered in a former search).

Figure 12:
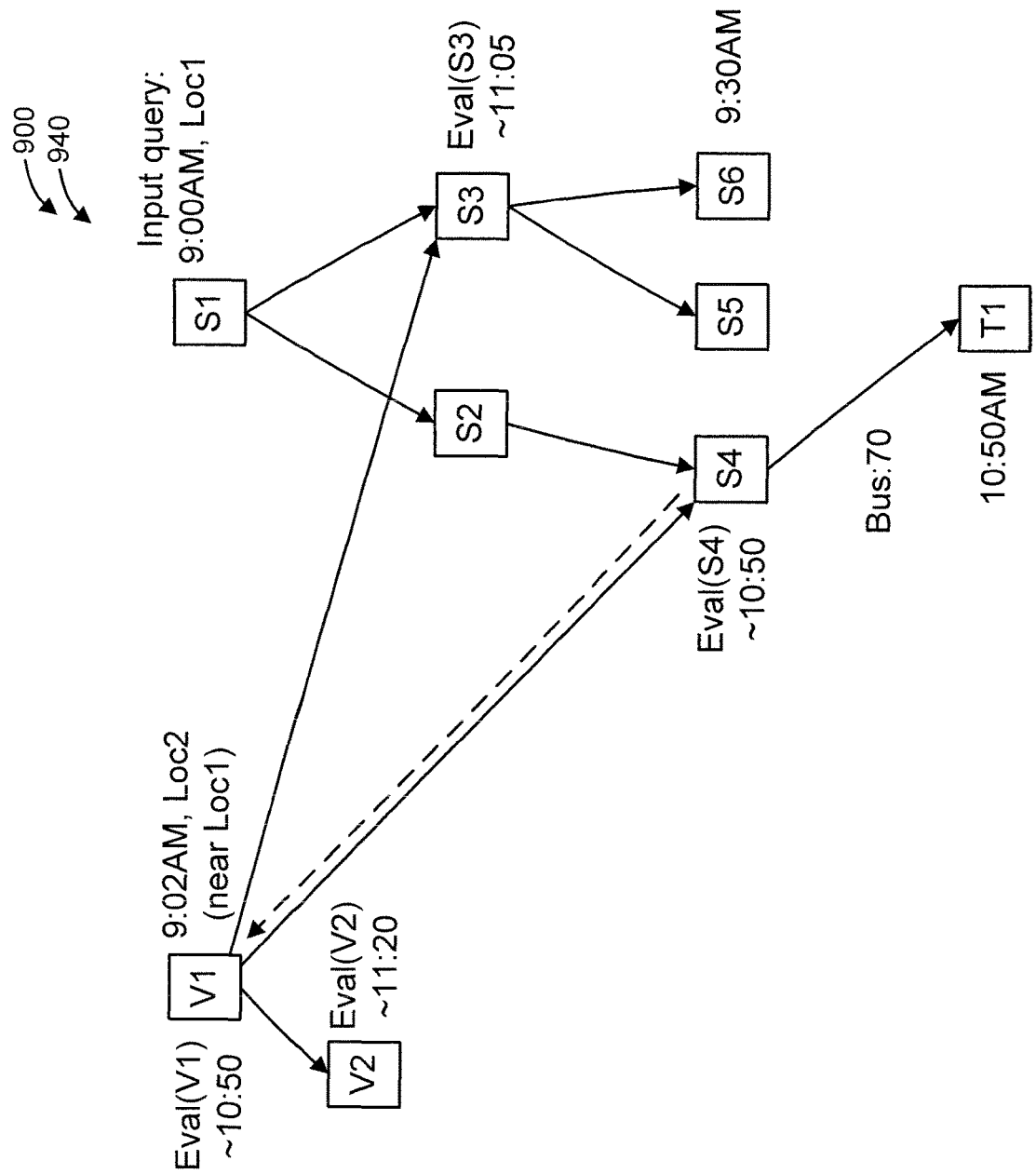
FIG. 12 shows a fourth step 940 of current search 900, in accordance with an embodiment of the present principles.

FIG. 12 shows a fourth step 940 of current search 900, in accordance with an embodiment of the present principles. In the fourth step 940, the three successor states of V1 are evaluated, and it is observed that S4 has the best evaluation among these successors (i.e., according to S4's estimation, one can reach the target from S4 by 10:50, which is earlier than S3's estimation (11:05) and V2's estimation (11:20). Furthermore, we know from the former search that the fragment S4→T1 is optimal. These details combined are sufficient to stop the search and infer that V1→S4→T1 is an optimal plan.

Advantages of the present principles include, but are not limited to, boosting the speed and the scalability of a journey planning service, and increasing the efficiency of a client application for journey planning. The preceding advantages result in reduced CPU requirements, with corresponding battery power savings, on a host mobile phone or other device to which the present principles are applied.

The present principles can be applied to multiple use cases, from a variety of domains that extend beyond the domain of public transportation alone including the following.

One use case involves a service providing journey plans to users. To scale to a large city and many travelers, such a service will need to be able to solve many queries in real time. Besides smooth functioning in normal circumstances, journey planning services need to be able to handle exceptional peaks that can greatly exceed the normal workload of the system. For example, big events in a city (e.g., Saint Patrick's Day, a big game at the stadium) can result in many journey planning requests. Many requests will be similar due to, for example, a common destination such as the stadium.

Another use case involves a social housing recommender system. To be able to include the public transportation options in the decision, a system needs to solve tens of thousands of journey plan requests, preferably in real time.

Yet another use case involves an accessibility analysis of public transportation. For example, evaluate the accessibility, via multi-modal transportation, to resources such as hospitals. Such an analysis involves solving many journey planning queries, many of which are similar due to a common destination (e.g., a hospital), similar destinations, and similar departure times. The accuracy of the evaluation depends crucially on the number of queries considered.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 13:
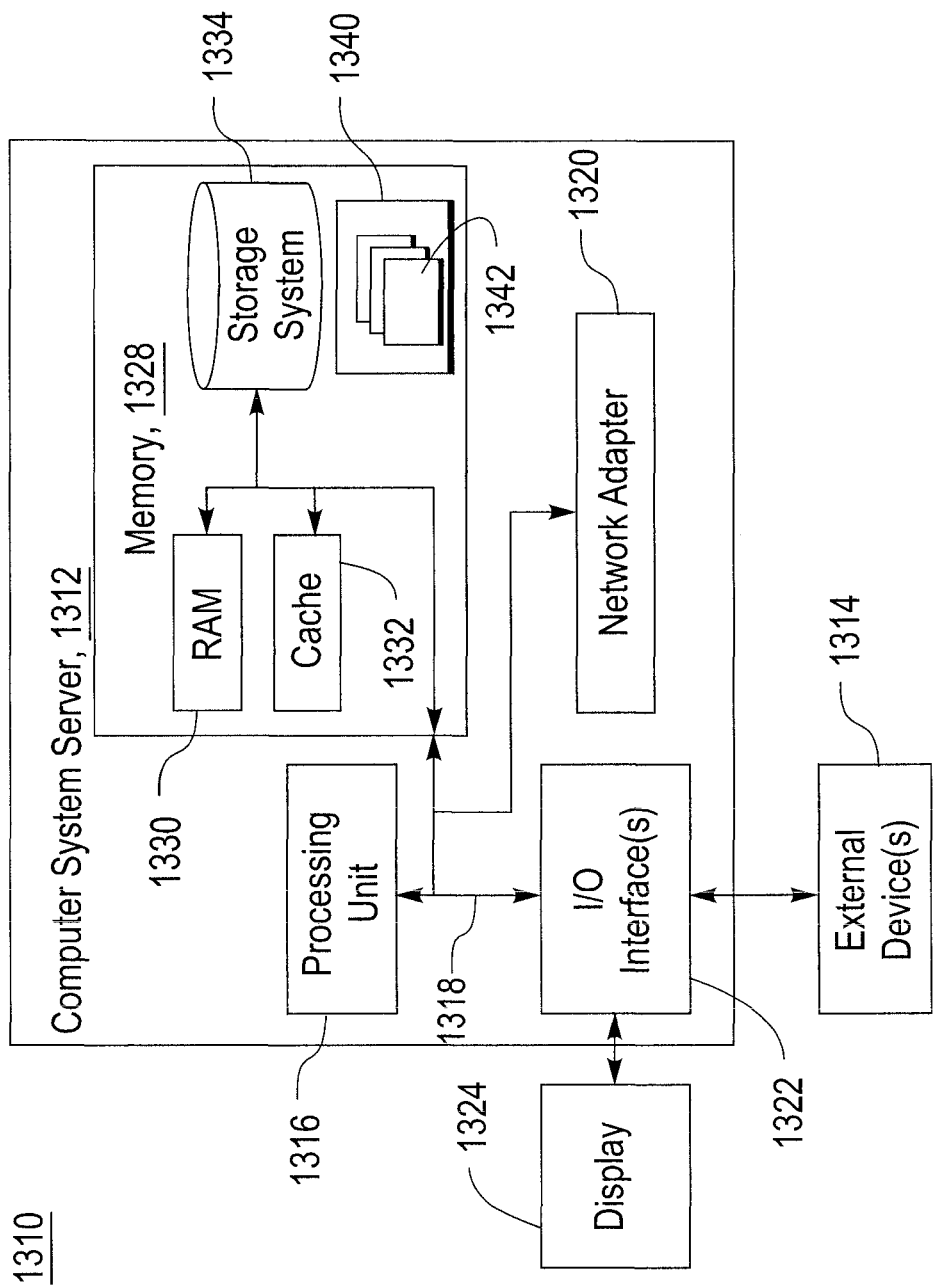
FIG. 13 shows an exemplary cloud computing node 1310, in accordance with an embodiment of the present principles.

Referring now to FIG. 13, a schematic of an example of a cloud computing node 1310 is shown. Cloud computing node 1310 is only one example of a suitable cloud computing node and is not intended to suggest any limitation as to the scope of use or functionality of embodiments of the invention described herein. Regardless, cloud computing node 1310 is capable of being implemented and/or performing any of the functionality set forth hereinabove.

In cloud computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1312 in cloud computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processor 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1312 typically includes a variety of computer system readable media. Such media may be any available media that is accessible by computer system/server 1312, and it includes both volatile and non-volatile media, removable and non-removable media.

System memory 1328 can include computer system readable media in the form of volatile memory, such as random access memory (RAM) 1330 and/or cache memory 1332. Computer system/server 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 1318 by one or more data media interfaces. As will be further depicted and described below, memory 1328 may include at least one program product having a set (e.g., at least one) of program modules that are configured to carry out the functions of embodiments of the invention.

Program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein.

Computer system/server 1312 may also communicate with one or more external devices 1314 such as a keyboard, a pointing device, a display 1324, etc.; one or more devices that enable a user to interact with computer system/server 1312; and/or any devices (e.g., network card, modem, etc.) that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples, include, but are not limited to: microcode, device drivers, redundant processing units, external disk drive arrays, RAID systems, tape drives, and data archival storage systems, etc.

Figure 14:
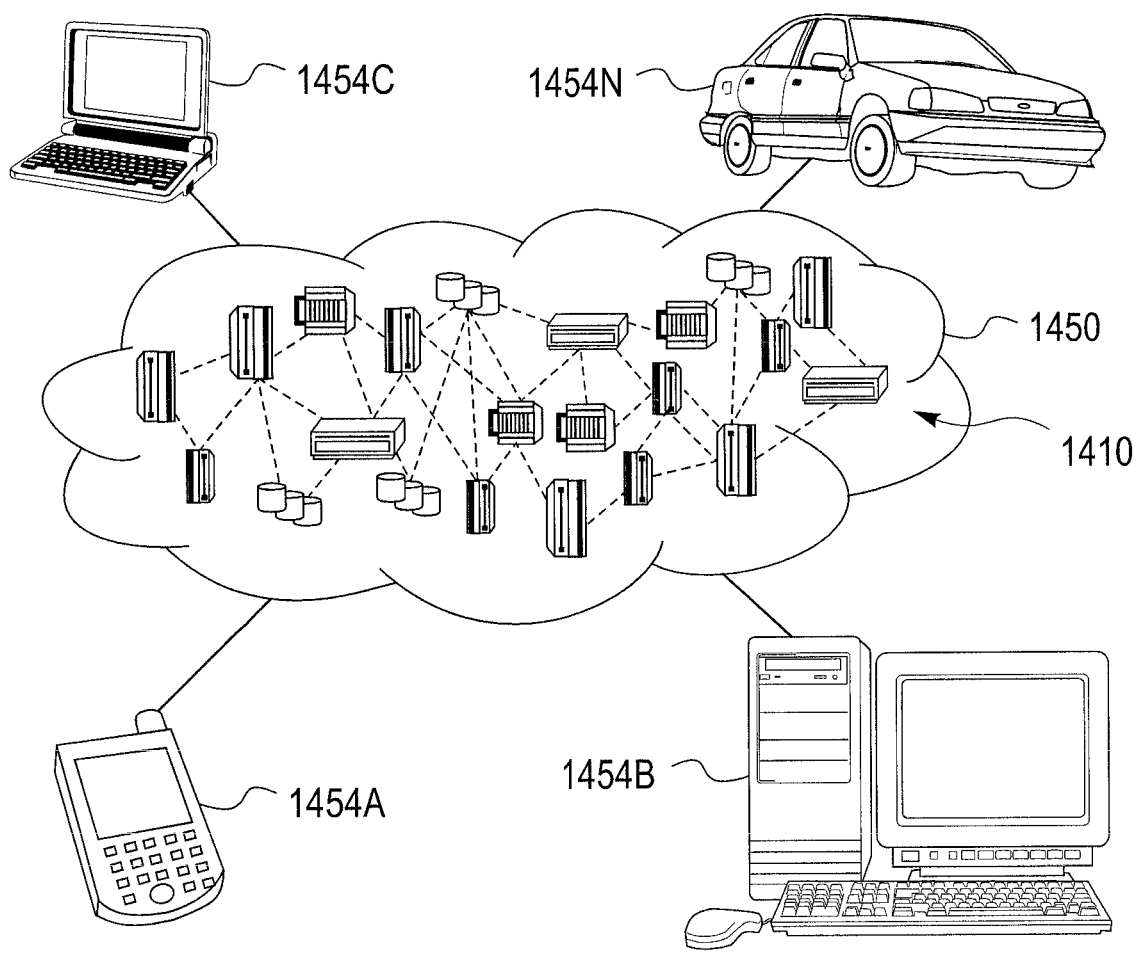
FIG. 14 shows an exemplary cloud computing environment 1450, in accordance with an embodiment of the present principles.

Referring now to FIG. 14, illustrative cloud computing environment 1450 is depicted. As shown, cloud computing environment 1450 comprises one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1410 and cloud computing environment 1450 can communicate with any type of computerized device over any type of network and/or network addressable connection (e.g., using a web browser).

Figure 15:
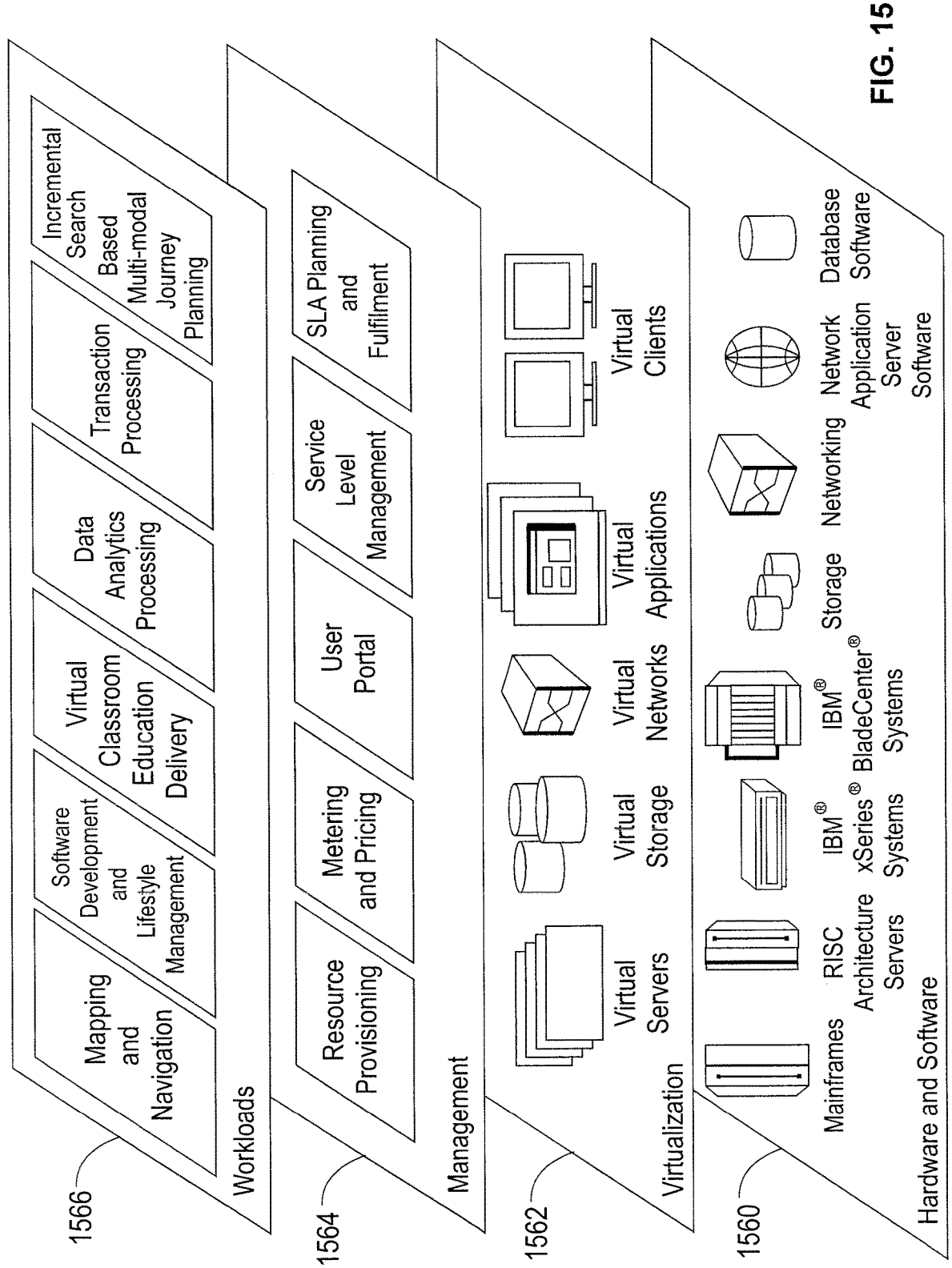
FIG. 15 shows exemplary abstraction model layers, in accordance with an embodiment of the present principles.

Referring now to FIG. 15, a set of functional abstraction layers provided by cloud computing environment 1550 (FIG. 11) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1562 provides an abstraction layer from which the following examples of virtual entities may be provided: virtual servers; virtual storage; virtual networks, including virtual private networks; virtual applications and operating systems; and virtual clients.

In one example, management layer 1564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and incremental search based multi-modal journey planning.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
   incrementally solving, by a processor-based journey plan incremental searcher, a current journey planning request from a user, wherein said solving step includes:
     performing a current search for at least one journey plan that satisfies the current journey planning request by accessing a database storing journey planning information derived from results to a plurality of previous journey planning requests;
     storing, in the database, at least part of the information discovered during the current search for responding to a subsequent journey planning request; and
     providing, on a display device, the at least one journey plan to the user,
   wherein multiple constraints are imposed on the at least one journey plan that include minimizing transportation mode changes using a maximum threshold for interchanges, and
   wherein the at least part of the information discovered during the current search for responding to the subsequent journey planning request includes a reusable portion of a search graph, pairs of a state and a lower bound on a best arrival time and pairs of a state and an exact value for the arrival time, the lower bound employed to increase an accuracy of a pre-computer heuristic function which guides the search based on state dominance in one or more search spaces in which heuristic values are back propagated and stored in the database.

2. The method of claim 1, wherein the database includes a cache, and wherein results stored for the current journey planning request or a previous journey planning request include a reusable portion, the reusable portion being stored in the cache.

3. The method of claim 1, wherein the database includes a cache, and wherein results stored for a previous journey planning request include a reusable portion stored in the cache, and wherein the at least one journey plan for the current journey planning request is computed while utilizing the reusable portion stored in the cache.

4. The method of claim 1, wherein transportation links corresponding to the at least one journey plan are time dependent, and the multiple constraints imposed on the at least one journey plan further include minimizing a travel time.

5. The method of claim 1, wherein the current search is performed over at least one search space having a plurality of states, each of the plurality of states having a respective temporal component.

6. The method of claim 5, wherein at least one of the plurality of states includes respective maximum thresholds for a walking time and a cycling time.

7. The method of claim 1, wherein results stored for the current journey planning request or a previous journey planning request include a reusable portion of a search graph, the reusable portion including at least one of a cost-to-goal estimation and an actual journey plan from a subset of states to a goal.

8. The method of claim 1, wherein results stored for a given state in a search space can be transferred to one or more other states in the search space or in another search space, based on dominance and commonality relations.

9. The method of claim 1, wherein the at least part of the information stored in the database comprises an information pair that includes a state of a search space and a lower bound on an arrival time.

10. The method of claim 1, wherein the at least part of the information stored in the database comprises an information pair that includes a state of a search space and an exact value of an arrival time.

11. The method of claim 1, wherein performing the current search for the at least one journey plan comprises guiding the search using a heuristic function.

12. The method of claim 11, wherein the heuristic function is used to estimate a travel time from a state of a search space to a given location.

13. The method of claim 12, wherein the given location is specified in the current journey planning request, and wherein the state of the search space includes a location that is unspecified in, but implicated by, the current journey planning request.

14. The method of claim 11, further comprising updating the heuristic function based on state dominance of states in one or more search spaces.

15. The method of claim 11, further comprising performing a back propagation technique that propagates heuristic values through a search graph space commencing at an end state of a graph search space or subgraph search space and traversing in a direction from end-to-beginning.

16. The method of claim 1, further comprising pruning a search space having a plurality of states using state dominance.

17. The method of claim 1, further comprising incrementally building the database at least from results of the plurality of previous journey planning requests.

18. A non-transitory article of manufacture tangibly embodying a computer readable program which when executed causes a computer to perform the steps of claim 1.

19. A system, comprising:
   a hardware-processor-based journey planning incremental searcher for incrementally solving a current journey planning request from a user, wherein said journey planning incremental searcher incremental solves the journey planning request from the user by:
     performing a current search for at least one journey plan that satisfies the current journey planning request by accessing a database storing journey planning information derived from results to a plurality of previous journey planning requests;
     storing, in the database, at least part of the information discovered during the current search for responding to a subsequent journey planning request; and
     providing, using a display device, the at least one journey plan to the user,
   wherein multiple constraints are imposed on the at least one journey plan that include minimizing transportation mode changes using a maximum threshold for interchanges, and
   wherein the at least part of the information discovered during the current search for responding to the subsequent journey planning request includes a reusable portion of a search graph, pairs of a state and a lower bound on a best arrival time and pairs of a state and an exact value for the arrival time, the lower bound employed to increase an accuracy of a pre-computer heuristic function which guides the search based on state dominance in one or more search spaces in which heuristic values are back propagated and stored in the database.

20. The system of claim 19, wherein the processor-based journey planning incremental searcher guides the current search using a heuristic function, and performs a back propagation technique that propagates heuristic values through a search graph space commencing at an end state of a graph search space or subgraph search space and traversing in a direction from end-to-beginning.

* * * * *